(12) United States Patent
Lai

(10) Patent No.: US 10,194,640 B2
(45) Date of Patent: Feb. 5, 2019

(54) PET TOY FILLED WITH FOAM LATEX

(71) Applicant: Chia-Sheng Lai, Taipei (TW)

(72) Inventor: Chia-Sheng Lai, Taipei (TW)

( * ) Notice: Subject to any disclaimer, the term of this patent is extended or adjusted under 35 U.S.C. 154(b) by 170 days.

(21) Appl. No.: 15/346,954

(22) Filed: Nov. 9, 2016

(65) Prior Publication Data

US 2018/0125034 A1 May 10, 2018

(51) Int. Cl.
*A01K 15/00* (2006.01)
*A01K 15/02* (2006.01)
*H01H 35/14* (2006.01)

(52) U.S. Cl.
CPC ......... *A01K 15/025* (2013.01); *H01H 35/144* (2013.01); *H01H 2231/01* (2013.01); *H01H 2235/022* (2013.01)

(58) Field of Classification Search
CPC ...... A01K 15/00; A01K 15/02; A01K 15/021; A01K 15/025; A01K 15/026
USPC ..... 119/702, 707; 446/46, 47; 473/595, 597, 473/598, 600, 607, 423
See application file for complete search history.

(56) References Cited

U.S. PATENT DOCUMENTS

| | | | | |
|---|---|---|---|---|
| 3,730,518 A * | 5/1973 | Drapcho | ................... | A63B 9/00 472/137 |
| 3,798,834 A * | 3/1974 | Samuel | ................... | A63H 33/18 362/802 |
| 5,316,293 A * | 5/1994 | Hamilton | ............... | A63B 43/00 446/400 |
| 5,388,825 A * | 2/1995 | Myers | ................... | A63B 43/06 473/570 |
| 5,873,761 A * | 2/1999 | Johnson | ................. | A63H 33/18 446/46 |
| 6,402,342 B1 * | 6/2002 | Chiang | .................. | A63H 33/18 362/184 |
| 6,505,576 B2 * | 1/2003 | Nathanson | ........... | A01K 15/025 119/702 |
| 6,557,496 B2 * | 5/2003 | Herrenbruck | ........ | A01K 15/025 119/707 |
| 6,764,371 B2 * | 7/2004 | Hartman | ................ | A63H 33/18 446/46 |
| 6,905,431 B2 * | 6/2005 | Pearce | ..................... | A23G 3/36 446/267 |
| 7,074,106 B1 * | 7/2006 | Deutsch | ............... | A01K 15/025 119/711 |
| 7,108,576 B2 * | 9/2006 | LaPointe | ................ | A63H 27/00 446/175 |
| 7,223,150 B2 * | 5/2007 | Chernick | ............... | A63H 33/18 446/175 |
| 7,347,758 B2 * | 3/2008 | Moore | ................... | A63H 33/18 446/219 |
| 7,390,555 B2 * | 6/2008 | Shane | ................. | B29C 37/0032 264/155 |
| 8,683,958 B2 * | 4/2014 | Oblack | ..................... | F41B 3/04 119/707 |
| 8,807,088 B2 * | 8/2014 | Axelrod | ............... | A01K 15/026 119/51.03 |

(Continued)

*Primary Examiner* — Richard T Price, Jr.
(74) *Attorney, Agent, or Firm* — Birch, Stewart, Kolasch & Birch, LLP

(57) ABSTRACT

Provided is a pet toy filled with foam latex. The pet toy filled with foam latex has a light emitting device mounted in a latex outer shell of the pet toy. The latex outer shell has an opening. The light emitting device can emit light and the light can pass through the opening to illuminate the outer space of the latex outer shell.

6 Claims, 3 Drawing Sheets

(56) References Cited

U.S. PATENT DOCUMENTS

| | | | | |
|---|---|---|---|---|
| 8,875,660 B2 * | 11/2014 | Grabois | ............... | A01K 63/003 |
| | | | | 119/247 |
| 8,978,590 B2 * | 3/2015 | Nunn | .................... | A01K 15/025 |
| | | | | 119/707 |
| 9,004,012 B2 * | 4/2015 | Taylor | .................. | A01K 15/026 |
| | | | | 119/710 |
| 9,021,990 B2 * | 5/2015 | Rutherford | .......... | A01K 15/026 |
| | | | | 119/707 |
| 9,707,472 B2 * | 7/2017 | Glass | ........................ | A63F 7/40 |
| 9,925,426 B2 * | 3/2018 | Fang | ....................... | F21V 15/01 |

\* cited by examiner

PET TOY FILLED WITH FOAM LATEX

BACKGROUND OF THE INVENTION

1. Field of the Invention

The present invention relates to a pet toy. The present invention further relates to a pet toy that is filled with foam latex and comprises a light emitting device.

2. Description of the Related Art

Modern people always suffer from pressure at the workplace or from the fast life paces. Most people may choose some leisure activities such as sports or keeping pets to release the pressure. Therefore, the industry related to pet keeping is popular at present.

The most common pets are dogs or cats. The keeper always likes to use a light emitting device to attract the attention of the pets. The light emitting device may be broken easily due to bites or scratches of dogs or cats. The broken light emitting device may hurt the skin of dogs or cats. Therefore, people need a safe light emitting device to play with the pets.

The safe light emitting device may be a soft device that is difficult to be broken by pets. Furthermore, pets can be attracted by the safe light emitting device as a pet toy for keepers to play with the pets.

SUMMARY OF THE INVENTION

An objective of the present invention is to provide a pet toy that may be filled with foam latex. Therefore, the pet toy may be a soft device. The pet toy is hard to be broken and enhances the safety for playing with the dogs and cats.

To achieve the foregoing objective, the pet toy filled with foam latex of the present invention comprises:

a latex outer shell comprising an opening;

a mounting cavity formed in the latex outer shell and the mounting cavity communicating with the opening;

a filled space formed between the latex outer shell and the mounting cavity, and the filled space filled with a filler;

a light emitting device mounted in the mounting cavity; and a transparent cover covered on the opening.

The advantage of the present invention is utilizing the cavity to mount the light emitting device in the latex outer shell. In addition, the light emitting device can illuminate the outer space of the latex outer shell through the opening and the transparent cover. The sight of the pets can be attracted by light emitted from the light emitting device. The light emitted from the light emitting device enhances the pets' interest in the pet toy filled with foam latex of the present invention.

Preferably, the filler is a liquid foam. The filler is distributed evenly in the filled space. The advantage of the present invention is that utilizing the liquid foam can produce soft materials around the cavity to protect the light emitting device mounted in the cavity. This prevents the light emitting device from being broken by rolling or throwing of the pet toy filled with foam latex. It also protects the pets from damage done by the broken light emitting device.

Preferably, the light emitting device is a light emitting ball.

More preferably, the light emitting ball comprises an outer shell, a circuit board mounted in the outer shell, a vibration switch mounted on the circuit board, a power supply electrically connected to the vibration switch, and at least one lighting member mounted on the circuit board. The advantage of the present invention is utilizing the circuit board and the vibration switch to control the illumination of the at least one lighting member during rolling and collision. Furthermore, the power supply can provide electric power to the at least one lighting member for bright illumination.

Most preferably, the vibration switch comprises a conductive spring and a conductive sheet. The conductive spring selectively contacts the conductive sheet by vibration. The advantage of the present invention is utilizing the conductive spring to contact the conductive sheet by rolling of the pet toy filled with foam latex. When the conductive spring contacts the conductive sheet, the electric circuit is formed. Then the at least one lighting member on the circuit board can emit light.

And most preferably, the power supply is at least one battery. The at least one battery can provide electric power to the lighting member for bright illumination.

Preferably, there are four ribs formed on the outer surface of the latex outer shell. The advantage of the present invention is utilizing the ribs to help the dogs and cats to catch and bite the pet toy filled with foam latex.

DETAILED DESCRIPTION OF THE INVENTION

Figure 1:
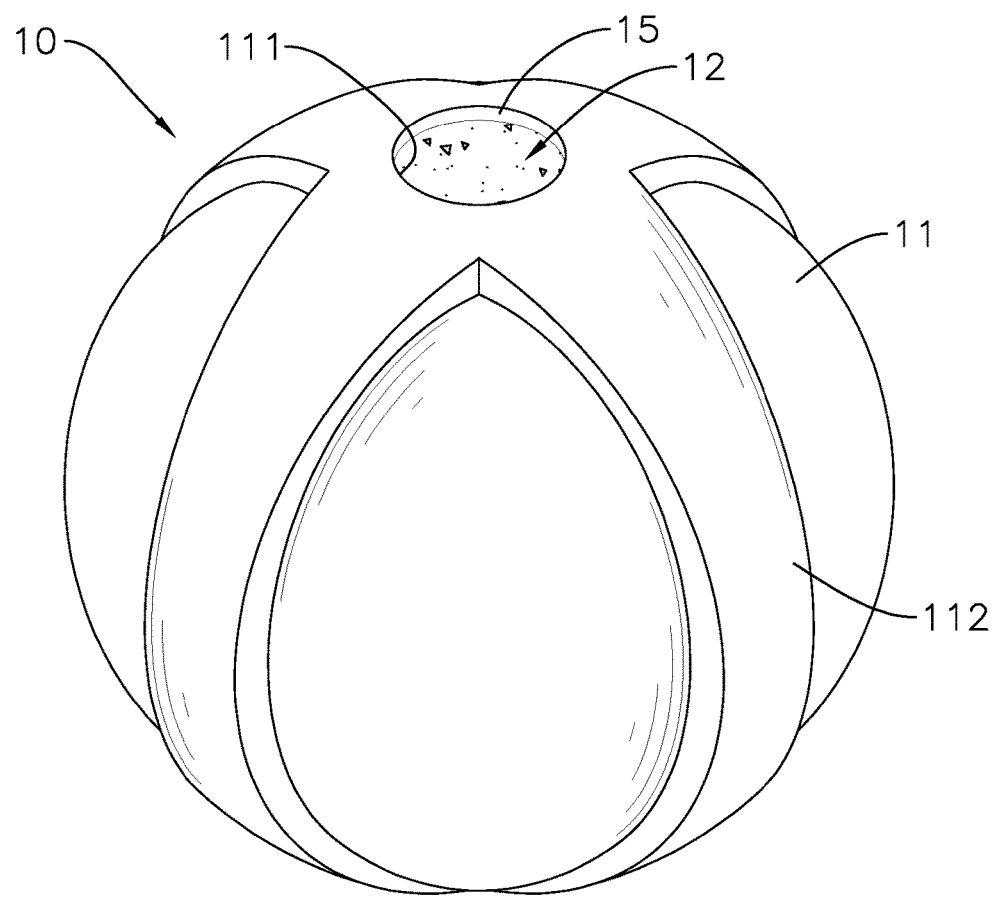
FIG. 1 is a perspective view of a pet toy of the present invention, shown filled with foam latex.
Figure 2:
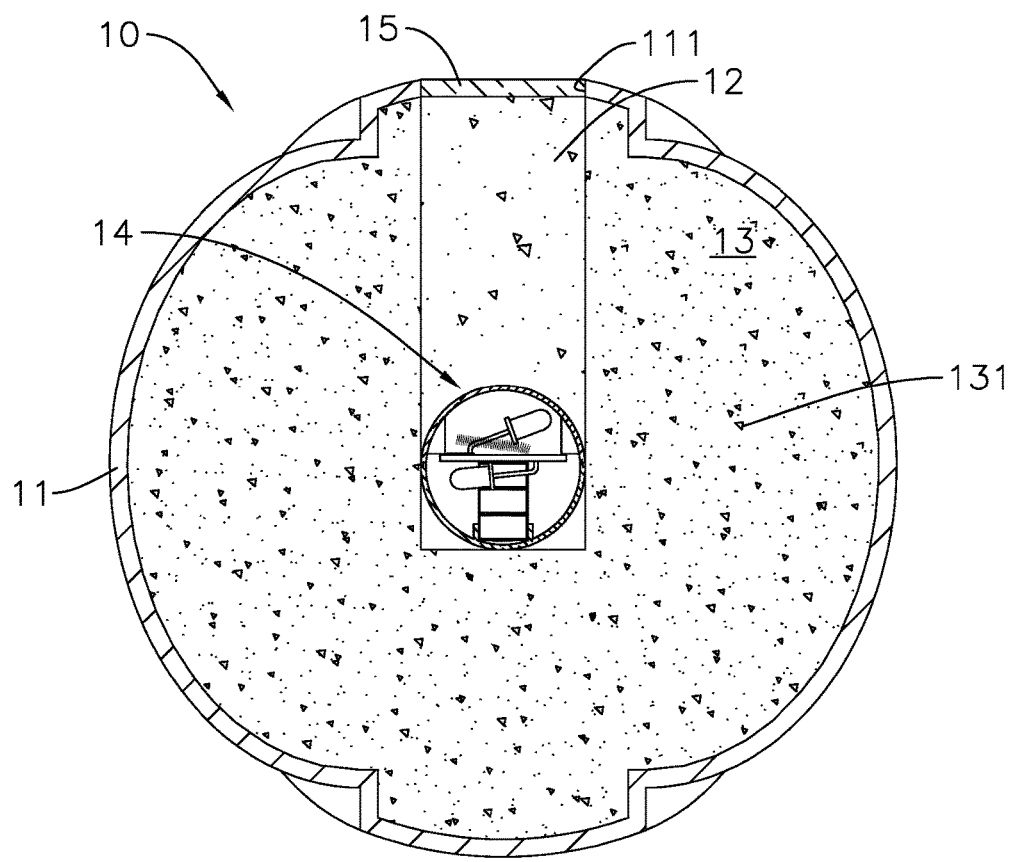
FIG. 2 is a cross-sectional side view of the pet toy of the present invention, shown filled with foam latex.

As shown in FIGS. 1 and 2, a pet toy filled with foam latex 10 of the present invention comprises a latex outer shell 11, a mounting cavity 12, a filled space 13, a light emitting device 14 and a transparent cover 15.

The latex outer shell 11 comprises an opening 111 formed on a side of the latex outer shell 11. The mounting cavity 12 is recessed in the latex outer shell 11, and the mounting cavity 12 communicates with the opening 111 directly. The filled space 13 is formed between the latex outer shell 11 and the mounting cavity 12. The filled space 13 is filled with a filler 131. The filler 131 is liquid foam, and the filler 131 is distributed evenly in the filled space 13. The light emitting device 14 is mounted in the mounting cavity 12. The light emitting device 14 may be stuck and pressed in the mounting cavity 12 or may move in the mounting cavity 12 freely. The transparent cover 15 covers the opening 111. The light emitting device 14 may be restricted in the mounting cavity 12 by the transparent cover 15.

Furthermore, there are four ribs 112 protruding from the outer surface of the latex outer shell 11. The ribs 112 allow the pets to catch and bite the pet toy filled with foam latex 10 of the present invention during the playing.

Figure 3:
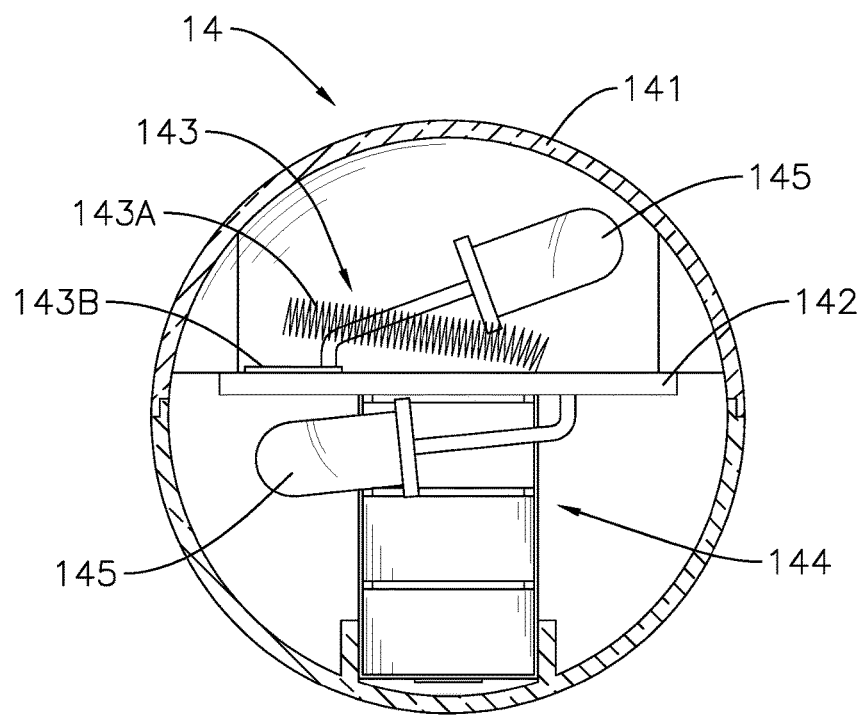
FIG. 3 is a cross-sectional side view of a light emitting ball of the pet toy of the present invention.

As shown in FIGS. 2 and 3, the light emitting device 14 is a light emitting ball. The light emitting ball comprises an outer shell 141, a circuit board 142, a vibration switch 143, a power supply 144, and two lighting members 145.

The circuit board 142 is mounted in the center of the outer shell 141. The vibration switch 143 is mounted on an upper side of the circuit board 142. The vibration switch 143 comprises a conductive spring 143A and a conductive sheet 143B. An end of the conductive spring 143A is mounted on the upper side of the circuit board 142. The other end of the conductive spring 143A is a free end. The conductive sheet 143B is also mounted on the upper side of the circuit board 142. The free end of the conductive spring 143A selectively contacts the conductive sheet 143B with vibration by the light emitting ball when the pet toy filled with foam latex 10 is rolling. The power supply 144 is electrically connected to the vibration switch 143. The power supply 144 is a battery. The two lighting members 145 are each respectively mounted on the upper side of the circuit board 142 and the lower side of the circuit board 142. When the pet toy filled with foam latex 10 is rolling with the vibration of the light emitting ball, the two lighting members 145 are lit up by the conductive spring 143A contacting the conductive sheet 143B and then penetrating through the transparent cover 15. Therefore, the pet toy filled with foam latex 10 can be illuminated when a pet plays with the pet toy filled with foam latex 10 of the present invention. The pet can be attracted by the light from the pet toy filled with foam latex 10 of the present invention to increase interest of the pet. Keepers watching the pet playing the pet toy filled with foam latex 10 of the present invention will feel relaxed and the pressure will be released.

In summary, the pet toy filled with foam latex 10 of the present invention is not only attractive but also safe to the pets. The light emitting device 14 well withstands bites or scratches of pets and would not break into sharp scraps to hurt the pets. The pet toy filled with foam latex 10 of the present invention may provide a novel toy for the keepers to play with the pets and help the keepers to release their daily pressure.

What is claimed is:

1. A pet toy filled with foam latex comprising:
   a latex outer shell comprising an opening;
   a mounting cavity formed in the latex outer shell and the mounting cavity communicating with the opening;
   a filled space formed between the latex outer shell and the mounting cavity, and the filled space filled with a filler;
   a light emitting device mounted in the mounting cavity, being a light emitting ball, and having
      an outer shell;
      a circuit board mounted in the outer shell;
      a vibration switch mounted on the circuit board;
      a power supply electrically connected to the vibration switch; and
      at least one lighting member mounted on the circuit board; and
   a transparent cover covered on the opening.

2. The pet toy filled with foam latex as claimed in claim 1, wherein the filler is a liquid foam and the filler is distributed evenly in the filled space.

3. The pet toy filled with foam latex as claimed in claim 1, wherein the vibration switch comprises a conductive spring and a conductive sheet; the conductive spring selectively contacts the conductive sheet by vibration.

4. The pet toy filled with foam latex as claimed in claim 1, wherein the power supply is at least one battery.

5. The pet toy filled with foam latex as claimed in claim 1, wherein multiple ribs are formed on an outer surface of the latex outer shell.

6. The pet toy filled with foam latex as claimed in claim 5, wherein a number of the ribs is four.

* * * * *